April 21, 1925.

E. F. GOBATTI 1,534,942

GREASE CUP PLUG

Filed Dec. 31, 1923

INVENTOR.

Edmund F. Gobatti

BY

ATTORNEY.

Patented Apr. 21, 1925.

1,534,942

UNITED STATES PATENT OFFICE.

EDMUND F. GOBATTI, OF PUEBLO, COLORADO.

GREASE-CUP PLUG.

Application filed December 31, 1923. Serial No. 683,776.

*To all whom it may concern:*

Be it known that EDMUND F. GOBATTI, a citizen of the United States of America, residing at Pueblo, in the county of Pueblo and State of Colorado, has invented new and useful Improvements in Grease-Cup Plugs, of which the following is a specification.

Heretofore in the construction of grease cups, the follower or plunger more or less binds due to its flat face operating against the grease to force the grease from the outlet end of the grease cup. Also in this type of grease cups the follower or plunger is very apt to recede or work back due to vibrations which necessitates the operator to again adjust the follower or plunger to bring it in contact with the grease to force it out of the discharge end of the cup.

The present invention has for its purpose the provision of a grease cup plug which is operable in the grease cup and can be readily rotated without binding, due to the provision of diametrically opposite cam faces on the inner face of the plug. In fact, the cam faces act to cam against the grease and gradually force it from the discharge or outlet end of the cup and, due to this, the plug may be readily rotated by the operator.

Another purpose is the provision of means comprising shoulders adjacent the cam faces which act to prevent a retrograde movement of the plug. The shoulders are relatively deep and due to the grease filling up behind them, the plug is retained against receding.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

Figure 2:
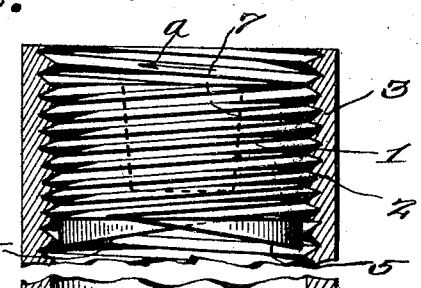
Figure 2 is a sectional view through a portion of a grease cup showing the plug in elevation.

Referring to the drawings, 1 designates the grease cup plug as a whole which may be constructed any size and of any suitable material, preferably aluminum. The plug is exteriorly threaded, as shown at 2, and is adapted for mounting in a grease cup 3, as shown in Figure 2, for forcing the grease toward the outlet end 4 of the grease cup.

Figure 1:
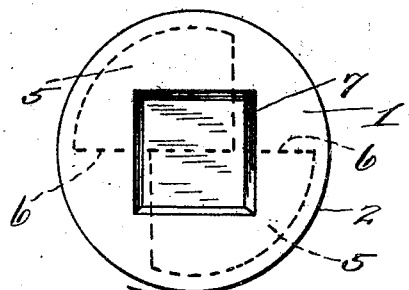
Figure 1 is a plan view of the grease cup plug constructed in accordance with the invention.
Figure 3:
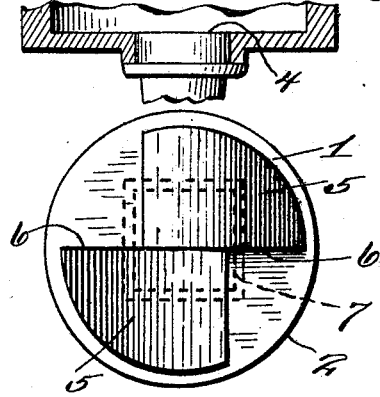
Figure 3 is a bottom plan view of the grease cup plug.

The inner face of the plug is provided with diametrically opposite cam faces 5 which, as shown in Figures 1 and 3, are segmental in contour. The cam faces incline in opposite directions and merge into the inner face of the plug so that when rotating the plug in the direction of the arrows *a*, as in Figures 1 and 2, the cam faces will cam against and force the grease from the discharge outlet of the cup.

The construction and arrangement of the cam faces are such as to cause shoulders 6 to be formed. These shoulders extend radially from the center of the plug and are so arranged and act in order to prevent retrograde movement of the plug. In fact, as the cam faces push against the grease and force it from the discharge or outlet end, the grease fills up behind the shoulders to prevent receding of the plug.

The upper or outer face of the plug is provided with an angular socket 7 constituting a sheet for the reception of a wrench or turning key to permit rotation of the plug in a direction to eject the grease from the cup on the journal to be lubricated. The provision of oppositely disposed cam faces results in each moving the grease toward and against the shoulder 6 of the other so that when rotation of the plug is stopped, the grease will be found backed up against each shoulder 6, the effective faces of the shoulders being restricted to the length of the radius of the plug by reason of the fact that two cam elements are provided in overlapping relation, so that one obstructs the face of the shoulder of the other at the center of the plug. By means of this arrangement, the possibility of the formation of a pocket behind the shoulder after the discontinuance of the turning movement imparted to the plug is avoided, whereas the pocket would be formed were but one cam element used and extended diametrically across the plug. The formation of a pocket would permit slight retrograde or reverse turning movement of the plug and the latter being screw-engaged, such movement might effect an elevation sufficiently to clear the shoulder from the grease.

While the illustrated embodiment illustrates the camming elements in protruding relation with the plug, it is obvious that they may be depressed in the lower surface of the plug and function in the same way.

The invention having been set forth, what is claimed is:

The combination with a grease cup having internal threads and a central outlet opening in its bottom, of an exteriorly threaded plug within the cup and engaging the internal threads thereof, the flat bottom face of the plug having cam sector elements, which have adjacent shoulders, the sector elements being of a length along said shoulders shorter than the diameter of the plug, whereby the shoulders edgewise overlap through the center and across the diameter of said bottom face, said sector elements having their outer margins adjacent to and concentric with the threaded periphery of the plug and provided with uncurved bottom faces, the entire surfaces of which, from the diametrically opposite corners of the sectors at the remote ends of the shoulders, are inclined in directions parallel with the shoulders and toward and terminating into the bottom face of the plug, whereby as the plug reaches the bottom of the cup, the grease will smear toward and through said outlet opening.

In testimony whereof he affixes his signature.

EDMUND F. GOBATTI.